(12) United States Patent
Nakayama et al.

(10) Patent No.: US 10,890,437 B2
(45) Date of Patent: Jan. 12, 2021

(54) SHEET FOR EVALUATING STRUCTURE DEFORMATION

(71) Applicant: 3M INNOVATIVE PROPERTIES COMPANY, St. Paul, MN (US)

(72) Inventors: Tasuku Nakayama, Ninomiya (JP); Kazuma Nuno, Sagamihara (JP)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 0 days.

(21) Appl. No.: 16/470,297

(22) PCT Filed: Dec. 18, 2017

(86) PCT No.: PCT/US2017/066962
§ 371 (c)(1),
(2) Date: Jun. 17, 2019

(87) PCT Pub. No.: WO2018/118753
PCT Pub. Date: Jun. 28, 2018

(65) Prior Publication Data
US 2020/0011657 A1    Jan. 9, 2020

(30) Foreign Application Priority Data
Dec. 22, 2016    (JP) ................. 2016-249022

(51) Int. Cl.
*B32B 7/05*     (2019.01)
*G01B 11/16*    (2006.01)
(Continued)

(52) U.S. Cl.
CPC .............. *G01B 11/165* (2013.01); *B32B 7/05* (2019.01); *B32B 7/12* (2013.01); *B32B 27/30* (2013.01);
(Continued)

(58) Field of Classification Search
CPC .. G01B 11/16; B32B 7/05; B32B 7/12; B32B 25/042; B32B 27/30; B32B 27/32;
(Continued)

(56) References Cited

U.S. PATENT DOCUMENTS

2018/0356211 A1    12/2018    Otsuka
2020/0011657 A1*    1/2020    Nakayama ........... G01B 11/165

FOREIGN PATENT DOCUMENTS

JP    H09236409    9/1997
JP    H1082614     3/1998
(Continued)

OTHER PUBLICATIONS

International Search report for PCT International Application No. PCT/US2017/066962 dated Feb. 16, 2018, 4 pages.

*Primary Examiner* — Betelhem Shewareged
(74) *Attorney, Agent, or Firm* — Michael Stern

(57) ABSTRACT

Problem: To provide a sheet that can clearly and easily measure displacement when displacement of a subject is small, and to provide an article for evaluating the deformation of a building containing this sheet. Resolution Means: A sheet having a first main surface and a second main surface facing the first main surface, including a first section having a first pattern image, a second section having a second pattern image, and the third section provided between the first section and the second section, wherein the first section has higher extensibility then the second section, the first section includes a first main surface of the sheet, the second section includes a second main surface of the sheet, the first pattern image is visible through the second pattern image, and the first main surface includes a high adhesive surface and a low adhesive surface.

15 Claims, 6 Drawing Sheets

(51) Int. Cl.
*B32B 27/30* (2006.01)
*B32B 27/36* (2006.01)
*B32B 27/38* (2006.01)
*B32B 27/32* (2006.01)
*B32B 7/12* (2006.01)
*B32B 27/40* (2006.01)

(52) U.S. Cl.
CPC .............. *B32B 27/32* (2013.01); *B32B 27/36* (2013.01); *B32B 27/38* (2013.01); *B32B 27/40* (2013.01); *Y10T 428/24802* (2015.01); *Y10T 428/24826* (2015.01)

(58) Field of Classification Search
CPC ......... B32B 27/36; B32B 27/38; B32B 27/40; Y10T 428/24802; Y10T 428/24826; Y10T 428/287
USPC ...................................................... 428/195.1
See application file for complete search history.

(56) References Cited

FOREIGN PATENT DOCUMENTS

| | | |
|---|---|---|
| JP | 2009-249485 | 10/2009 |
| JP | 2010-271253 | 12/2010 |
| JP | 2011-191282 | 9/2011 |
| JP | 2012-093260 | 5/2012 |
| WO | WO 2006-017302 | 2/2006 |
| WO | WO 2015-142779 | 9/2015 |
| WO | WO 2015-199957 | 12/2015 |
| WO | WO 2017-048610 | 3/2017 |
| WO | WO 2017-127561 | 7/2017 |
| WO | WO 2017-127569 | 7/2017 |
| WO | WO 2017-127572 | 7/2017 |
| WO | WO 2018-093655 | 5/2018 |
| WO | WO 2018-144213 | 8/2018 |

* cited by examiner

SHEET FOR EVALUATING STRUCTURE DEFORMATION

CROSS REFERENCE TO RELATED APPLICATIONS

This application is a national stage filing under 35 U.S.C. 371 of PCT/US2017/066962, filed Dec. 18, 2017, which claims the benefit of JP Application No. 2016-249022, filed Dec. 22, 2016, the disclosure of which is incorporated by reference in its/their entirety herein.

TECHNICAL FIELD

The present disclosure relates to a sheet, and an article for evaluating deformation of a structure containing that sheet.

BACKGROUND

Conventionally, various methods for detecting distortion, damage, and the like of an object such as a building have been proposed. Deformation of concrete walls of structures such as buildings, for example, causes severe damage to the structure. Measurement using a strain gauge or a ruler is conventionally known as a method of monitoring progress of such deformation. However, these methods may have variations in measurement values (in other words, measurement errors) by the measurer due to the measurement method using a strain gauge or a ruler, and do not sufficiently satisfy the requirement of accurate detection of deformation. Furthermore, measurements must be performed close to the objects measured. Therefore, there is demand for a method that is capable of accurate and simple deformation measurement without the need to be close to the object to be measured.

Patent Document 1, JP 2011-191282 A, provides a displacement measuring method that uses a moiré fringe for measuring a minute relative displacement between two points using a moiré fringe, where a lattice having spatially periodic structure is displayed on each of two plate like parts of a measuring device made from two plate like parts set so as to overlap one another following an object to be measured, and displacement in the object to be measured by reading an amount of movement of the moiré fringe generated by optical interference between lattices.

Patent Document 2, JP H10-082614 A, provides a minute displacement measuring device for measuring a minute displacement in an observation point using a moiré fringe, provided with imaging means for imaging a true lattice having a spatially periodic structure set in the observation point, conversion means for converting an image output of the imaging means to a digital signal and outputting true lattice image data, and image processing means for averaging separately created reference lattice image data with the true lattice image data output from the conversion means and outputting moiré fringe image data.

Patent document 3, JP 2010-271253 A, provides a minute displacement display device attached directly or indirectly to an object to be measured, provided with a fixed side moiré slit plate to which a plurality of parallel lines have been applied, a vibration transmitting member attached directly or indirectly to an object to be measured, a transducer fixed to the vibration transmitting member, and a mobile side moiré slit plate, to which a plurality of parallel lines have been applied, fixed to the transducer, where a moiré fringe is expressed by overlapping and arranging the fixed side moiré slit plate and the mobile side moiré slit plate so that the angles of the parallel lines differ, the mobile side moiré slit plate is slid by a displacement of the transducer caused by a vibration of the object to be measured through the vibration transmitting member, and a displacement amount of the moiré fringe is displayed larger than a displacement amount of the transducer.

Patent Document 4, JP 2012-093260 A, provides a concrete crack sensor configured of a fiber containing plastic plate formed by impregnating a matrix resin into sheet like fibers, and an adhesive for adhering the fiber containing plastic sheet to a concrete surface, where the fiber containing plastic plate is adhered using the adhesive so as to straddle a crack in concrete to be measured so that a length of the crack can be detected based on a whitened part generated in conjunction with an increase in a width of the crack.

Patent Document 5, JP 2015-184043 A, discloses a sheet having a deformation following section having a first pattern image, a non-deformation following section having a second pattern image, and a deformation buffering section present between the deformation following section and the non-deformation following section, where the first pattern image is visible through the second pattern image.

SUMMARY

Problem to be Solved

However, with the methods described in Patent Documents 1 to 3, the configuration of the device for measuring the component for generating a moiré fringe and the generated moiré fringe is complex, and measurement of the displacement cannot easily be performed. On the other hand, with the sensor described in Patent Document 4 and the sheet described in Patent Document 5, it is conceivable that measuring the displacement could be performed relatively easily, but there is room for improvement from the perspective of clearly measuring the displacement because the amount of displacement is small in the initial stages where displacement is generated by deformation, damage, or the like of the subject.

An object of the present disclosure is to resolve the aforementioned problems and to provide a sheet that can clearly and easily measure displacement when displacement of a subject is small, and to provide an article for evaluating the deformation of a building using this sheet.

Means for Solving the Problem

One aspect of the present disclosure provides a sheet having a first main surface and a second main surface facing the first main surface;
wherein the sheet has
a first section with a first pattern image,
a second section with a second pattern image, and
a third section provided between the first section and the second section;
the first section has higher extensibility than the second section,
the first section includes the first main surface of the sheet,
the second section includes the second main surface of the sheet,
the first pattern image is visible through the second pattern image, and
the first main surface includes a high adhesion surface and a low adhesion surface.

Another aspect of the present disclosure provides a sheet having a first main surface and a second main surface facing the first main surface;
wherein the sheet has
a first section with a first pattern image,
a second section with a second pattern image, and
a third section provided between the first section and the second section;
the first section has higher extensibility than the second section,
the first section includes the first main surface of the sheet,
the second section includes the second main surface of the sheet,
the first pattern image is visible through the second pattern image, and
the first main surface includes a first adhesive part and a second adhesive part separated from the first adhesive part.

Another aspect of the present disclosure provides an article for evaluating deformation of a building, containing this sheet.

Effect of the Solution

Some embodiments of the present disclosure provide a sheet that can clearly and easily detect displacement even when the displacement is small, when detecting the displacement of a subject, and to provide an article for evaluating the deformation of a building using this sheet.

DETAILED DESCRIPTION

While embodiments of the present disclosure are described below, the present disclosure is not limited to the following embodiments, and any modification that does not depart from the spirit and scope of the claims is intended to be included in the present disclosure.

Figure 1A:
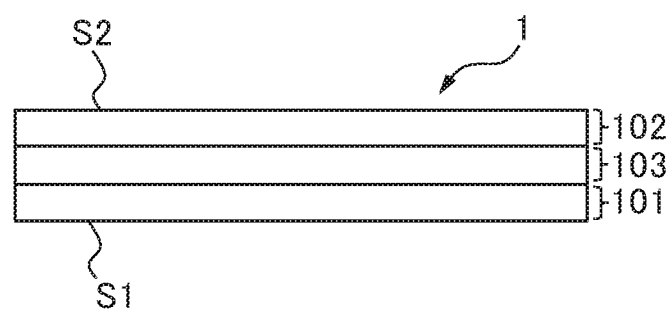
FIGS. 1A and 1B each is a diagram illustrating an example of the sheet according to the present disclosure.
Figure 1B:
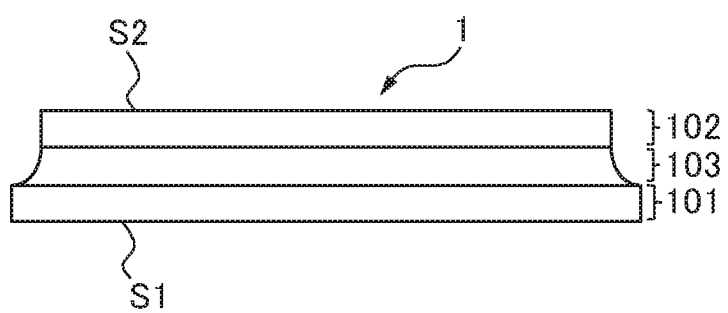

FIGS. 1A and 1B are drawings illustrating examples of the sheet according to the present disclosure, where FIG. 1A illustrates a sheet in an non-deformed state prior to use and FIG. 1B illustrates a sheet in a deformed state during use. An embodiment according to the present disclosure provides a sheet 1 having a first main surface S1 and a second main surface S2 facing the first main surface S1. The sheet 1 has a first section 101 having a first pattern image (not illustrated in the figure), a second section 102 having a second pattern image (not illustrated in the figure), and a third section 103 present between the first section 101 and the second section 102. In an embodiment, the first section 101 has larger extensibility than the second section 102. In the present disclosure "extensibility is large" means that, for example, a modulus of elasticity (Young's modulus) numerical value is small, a numerical value of elongation is large when pulled with the same force, and a numerical value of elongation up to breaking is large (not all of these numerical values need to be satisfied). In an embodiment, the first section 101 includes the first main surface S1 of the sheet 1, and the second section 102 includes the second main surface S2 of the sheet 1. In an embodiment, the first pattern image is visible through the second pattern image. In an embodiment, the sheet according to the present disclosure is configured so that a partial area of the first main surface S1 can be fixed to an object.

The first section 101 has the first pattern image, and the second section 102 has the second pattern image. The sheet 1 according to the present disclosure is configured so that moiré fringe generated by the first pattern image and the second pattern image can be detected. More specifically, the first pattern image is visible through the second pattern image. Here, the first pattern image being visible through the second pattern image means that the first pattern image can be visualized together with the second pattern image when the sheet 1 is observed from the second main surface S2 side. Any visualization means can be selected, for example, pattern image imaging can be exemplified under visual light using a variety of cameras. According to a configuration where the first pattern image is visible through the second pattern image, a moiré fringe generated by interference between the first pattern image and the second pattern image is also visible. Therefore, according to the sheet according to the present disclosure, a deformation of an object can be evaluated simply, for example, the deformation can be evaluated from a distance without the need to get close to the object.

In a preferred embodiment in which the first pattern image is visible through the second pattern image, a portion of the sheet according to the present disclosure, from the first pattern image to the sheet surface through the second pattern image, is typically configured of a clear material. In the present disclosure a "clear material" means a material with a total light transmittance of at least 30%, and more preferably at least 80%, for light with a wavelength of 300 to 830 nm. The aforementioned total light transmittance is a value measured using an NDH2000 haze meter (manufactured by Nippon Denshoku Industries, Co., Ltd., Bunkyo-ku, Tokyo).

One main characteristic of the sheet according to the present disclosure is that the first pattern image is distorted by the first section displacement, and that the second pattern image having the second section is substantially unaffected by the distortion of the first pattern image, that is, substantially does not distort. When the sheet is fixed to an object, displacement of the object can be detected through the distortion of the first pattern. Furthermore, the displacement generated in the object can be evaluated by detecting and evaluating a moiré fringe generated by the distortion of the first pattern image and the undistorted second pattern image.

Because the first section 101 has larger extensibility than the second section 102, the first section 101 can function as a deformation following section (that is, a portion having the ability to displace following the displacement of the object when the object displaces in a state where the sheet is fixed to the object (as illustrated in FIG. 1B), and the second section 102 can function as a non-deformation following section (that is, a portion where displacement substantially does not follow the displacement when the first section displaces and that, accordingly substantially does not displace (as illustrated in FIG. 1B). In a typical embodiment, the third section 103 can function as a deformation buffering section (that is, a portion having adequate deformation buffering ability so that the second section 102 is substantially not displaced by the displacement of the first section 101 (as illustrated in FIG. 1B).

In an embodiment, the sheet according to the present disclosure is fixed to an object in a state where one area of the first main surface S1 (also referred to as a fixing area in the present disclosure) is fixed to the object, and the other area thereof (also referred to as a non-fixing area in the present disclosure) is not fixed to the object. In an embodiment, the fixing area is provided with sufficient adhesion so that the sheet adheres to an object (for example, a building when the sheet is used for building deformation evaluation) that acts as an adherend. On the other hand, there is no need to provide the non-fixing area with enough adhesion so as to be able to adhere to the object. That is, the first main surface of the sheet according to the present disclosure may be adhered to the object using substantially only the fixing area.

Figure 2A:
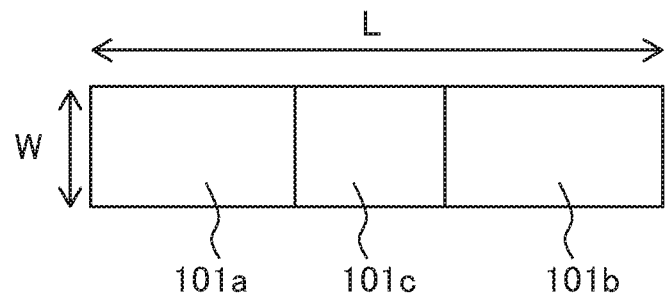
FIGS. 2A-2C are diagrams illustrating examples of fixing areas and non-fixing areas in a first main surface of the sheet according to the present disclosure.
Figure 2B:
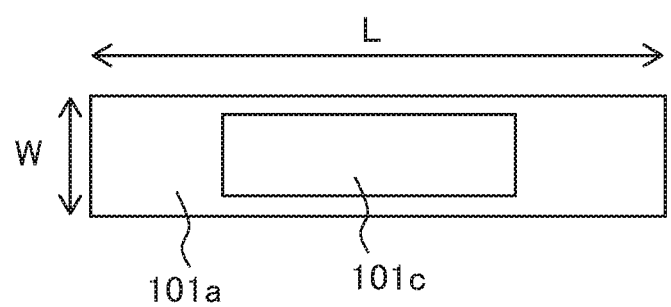
Figure 2C:
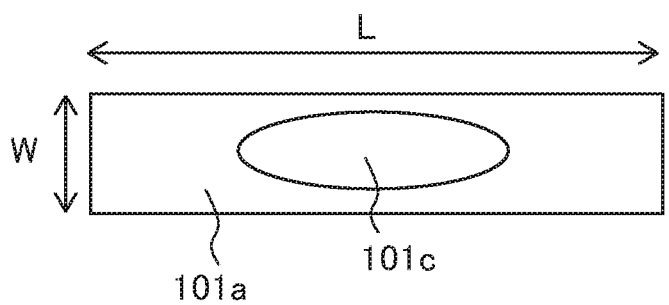

FIGS. 2A-2C are drawings illustrating examples of fixing areas and non-fixing areas in a first main surface of the sheet according to the present disclosure. In the exemplified embodiments, an arrangement of fixing areas 101a, 101b, and a non-fixing area 101c may be suitable to, for example, measurement (for example, measurement of linear damage or displacement when a crack width increases) of displacement when the fixing areas 101a, 101b that sandwich the rectangular non-fixing area 101c, which extends over an entire width (W) direction in a length (L) direction center portion of a first main surface like that illustrated in FIG. 2A, expand in the length L direction, but is not limited thereto. Furthermore, arrangement of the rectangular non-fixing area 101c arranged in a central portion in the length L direction and the width W direction and the surrounding fixing area 101a as illustrated in FIG. 2B, as well as the elliptical non-fixing area 101c arranged in a central portion in the length L direction and the width W direction and the surrounding fixing area 101a, as illustrated in FIG. 2C, are suitable for measuring (for example, measurement of point-like damage or displacement when a crack expands radially) displacement that expands radially in the length L and the width W directions.

Figure 3:
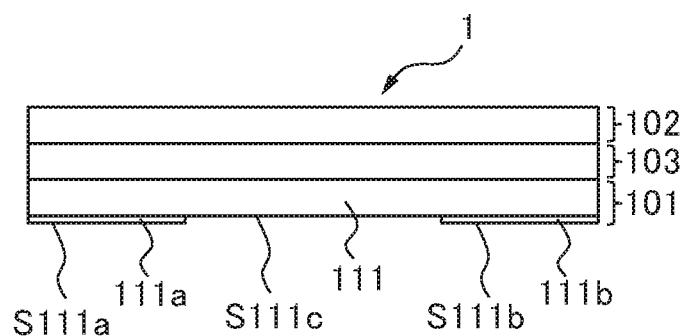
FIG. 3 is a diagram illustrating examples of the sheet according to the present disclosure.
Figure 4:
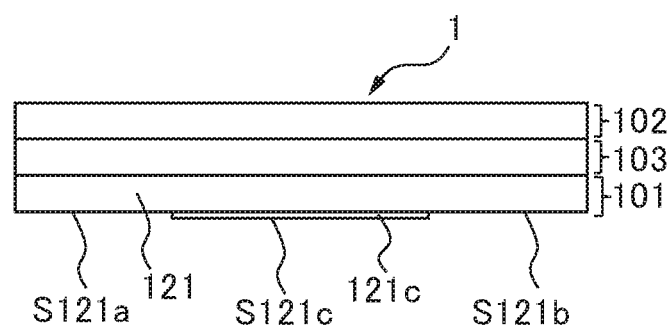
FIG. 4 is a diagram illustrating examples of the sheet according to the present disclosure.
Figure 5:
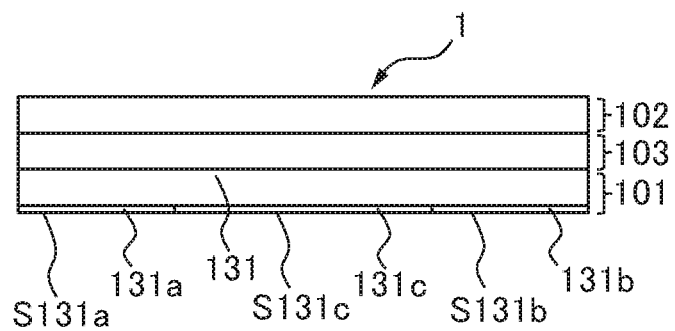
FIG. 5 is a diagram illustrating examples of the sheet according to the present disclosure.

FIG. 3 to FIG. 5 are the diagrams that illustrate examples of the sheet according to the present disclosure. In an embodiment, combinations of the fixing areas 101a, 101b, and the non-fixing area 101c include a combination of high adhesion surfaces S121a and S121b and a low adhesion surface S111c, a combination of high adhesion surfaces S121a and S121b and a low adhesion surface 121c, and a combination of high adhesion surfaces S121a and S121b and a low adhesion surface S131c, and the like. In these embodiments, the first main surface S1 of the sheet 1 is configured of a high adhesion surface and a low adhesion surface. In the present disclosure, a "high adhesion surface" means that adhesive force is stronger than a "low adhesion surface" when the sheet is affixed to an adherend. Strong adhesive force means that, for example, peel force (90° peel, and the like), shear force, and holding force values are high (it is not necessary for all values to be high). The "low adhesion surface" may be a so-called surface with substantially no adhesive force. Note that FIG. 3 through 5 exemplify cases where the fixing areas 101a, 101b, and the non-fixing area 101c are arranged as illustrated in FIG. 2A.

In an embodiment, as illustrated in FIG. 3, the high adhesion surfaces S121a and S121b are provided by a high adhesion section (as a first adhesion section 111a, and a second adhesion section 111b arranged by being separated from the first adhesion section 111a) arranged on a low adhesive main body 111 of a first section 101, and the low adhesion surface S111c is provided by a portion where the main body 111 is exposed.

In another embodiment of FIG. 3, as illustrated in FIG. 4, the high adhesion surfaces S121a and S121b are provided by a portion where the high adhesive main body 121 of the first section 101 is exposed, and the low adhesion surface S121c is provided by a low adhesion section 121c arranged on the main body 121.

In another embodiment of FIG. 3 and FIG. 4, as illustrated in FIG. 5, the high adhesion surfaces S131a and S131b are provided by a high adhesion section (as a first adhesion section 131a, and a second adhesion section 131b arranged by being separated from the first adhesion section 131a) arranged on a main body 131 (which may have high adhesion or low adhesion) of the first section 101, and the low adhesion surface S131c is provided by a low adhesion section 131c arranged on the main body 131.

The aforementioned low adhesive main body can be configured as, for example, a high extensibility layer using a material like that described below.

The aforementioned high adhesion section can be configured using a pressure sensitive adhesive, examples of which include single layer film type pressure sensitive adhesive films, double sided adhesive sheets having two pressure sensitive adhesive layers, and the like. The pressure sensitive adhesive can be formed as a coating film containing an adhesive polymer. A preferred adhesive contains a crosslinking agent for crosslinking an adhesive polymer with an adhesive polymer. In the present disclosure, an adhesive polymer means a polymer that shows adhesiveness at ambient temperature (approximately 25° C.). Examples of pressure sensitive adhesives include acrylic types, rubber type polyurethanes, epoxy types, and the like.

The aforementioned high adhesive main body can be configured using the aforementioned adhesive polymers.

The aforementioned low adhesion section may be configured using a material with substantially no adhesive force with respect to an adherend, which is a material like that described below, as a high extensibility layer, may be configured using a material for enhancing slipperiness with respect to an adherend like a fluorine type resin, may be the same material as the aforementioned high adhesion section, and may be a material where adhesive force is weaker than the high adhesion section.

The moiré fringe of the sheet is detected when evaluating the displacement of the subject using the sheet of the present disclosure. The moiré fringe detector is not necessarily approach the vicinity of the sheet, so the sheet of the present disclosure is advantageous from the perspective of simple evaluation. In addition, the sheet of the present disclosure is advantageous from the perspective of being inexpensive and that installation is simple because a power source or the like is not required.

Figure 6A:
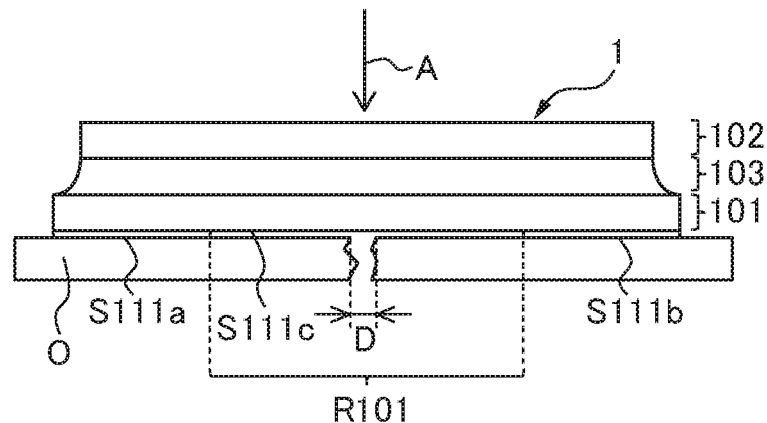
FIGS. 6A and 6B are diagrams for describing evaluation of displacement of a subject using the sheet of the present disclosure.
Figure 6B:
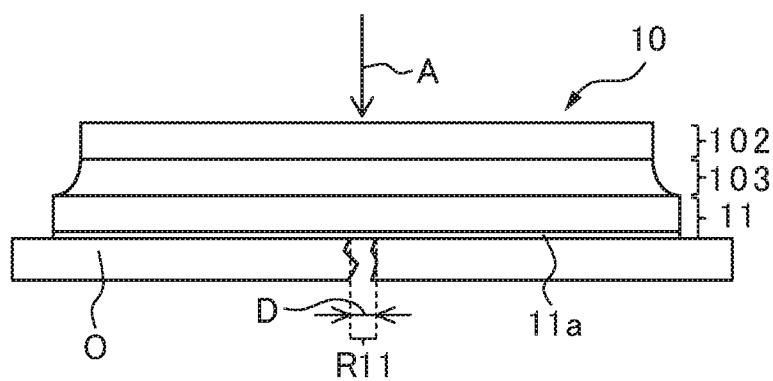

Furthermore, the sheet of the present disclosure is advantageous from the perspective that displacement can clearly be measured, particularly when displacement of a subject is small. The reason that these advantages can be obtained when the sheet of the present disclosure is fixed to the subject is described below. FIGS. 6A-6B are diagrams for describing evaluation of displacement of a subject using the sheet of the present disclosure. FIG. 6A illustrates the evaluation of displacement of a subject using the sheet 1 of the present disclosure illustrated in FIG. 3, and FIG. 6B illustrates the evaluation of displacement of a subject using a comparative sheet 10. The comparative sheet 10 has an adhesive part 11a formed on the entire first main surface, as well as a first section 10 that is similar to the first section 101 of the sheet illustrated in FIG. 3, and a second section 102 and a third section 103 that are similar to the sheet 1.

In reference to FIG. 6A, when displacement of displacement amount D occurs in a subject O when the sheet is fixed to the subject O by the high adhesion surfaces S111a, S111b, the first section 101 of the sheet will be displaced by tracking the displacement of the subject O. On the other hand, the second section 102 has lower extensibility than the first section 101, and will not track the displacement of the first section 101. Therefore, interference will occur between the first pattern image and a second pattern image, and a moiré will appear. At this time, the low adhesion surface S111c of the sheet is not fixed to the subject O, and therefore the moiré is measured on the entire region R101 corresponding to the low adhesion surface S111c when the sheet is viewed in the normal line direction (in other words direction of arrow A in the figure) of the first main surface from the second main surface side of the sheet. The moiré period will be largely expressed when the difference between the periods of the 2 interfering pattern images is small. Therefore, the first pattern image and the second pattern image are made to interfere by the displacement of displacement amount D, and when the moiré expressed thereby is measured in the region R101 that is a region that is wider than the region where the displacement occurred, the moiré can be evaluated at a larger period and across a larger viewing area then with the comparative sheet 10 (in other words, when the moiré due to displacement amount D is measured in region R11). Therefore, the sheet of the present disclosure is advantageous from the perspective that displacement can clearly be measured, particularly when displacement of a subject is small.

Furthermore, the device for detecting and recording the displacement can be simplified by clear moiré measurement in a large surface area. For example, displacement evaluation using the sheet of the present disclosure is sufficiently effective even when using a standard camera. Therefore, displacement evaluation can be performed at low cost and minimal time by using the sheet of the present disclosure.

The first section, second section, and third section of the sheet according to the present disclosure can be configured using a single layer or a plurality of layers. The first section, second section, and third section may be configured by giving the single layer appropriate thickness and physical properties. Furthermore, the first section, second section, and third section may be configured using a plurality of layers having mutually different materials, thicknesses, and the like. Furthermore, in yet another exemplary embodiment, the first section, second section, and third section can be configured of two layers; being a layer that functions as the first section and the second section and a layer the functions as the third section, or, of two layers; being a layer that functions as the first section, and a layer the functions as the second section and the third section. As has been described above, a layer configuration of the sheet can be designed at random under the condition that the configuration has a portion that functions as the first section, second section, and third section.

Any conventionally well-known pattern used to evaluate displacement using moiré can be applied as the first pattern and the second pattern. Pattern image details, for example, pattern image shape type, pitch, and the like, can be appropriately selected based on a targeted amount of displacement, and the like. Examples of pattern image shapes include grids, staggered patterns, dots, pluralities of parallel straight lines, and the like. In an exemplary embodiment, the first and second pattern images can be grids each having pitches of approximately 0.4 mm to approximately 0.8 mm. For example, there are many cases where it is desirable to detect displacement of, for example, approximately 0.1 to 2.0 mm, in deformation evaluations of building walls, and the like, which is a preferred application for the sheet according to the present disclosure. Examples of a shape and pitch of a pattern image appropriate for such an application include a pitch of approximately 0.3 mm to approximately 1.0 mm in a sheet approximately 100 mm long per side.

In a preferred embodiment, a displacement amount ratio of the second section with respect to 100% of the displacement amount of the first section can be approximately 30% or less, 20% or less, 10% or less, or approximately 0%. The aforementioned ratio may be satisfied at any arbitrary time until at least a part of the sheet is torn in the displacement measuring method described below. However, in a preferred embodiment, the aforementioned ratio is satisfied at all points in time until at least a part of the sheet is torn when, for example, a displacement is increased in a state where the first section is displaced 0 mm.

Additionally, in a preferred embodiment, the displacement shown by the second section is approximately 3 mm or less, approximately 2.0 mm or less, approximately 1.0 mm or less, or approximately 0 mm when the first section is displaced 10 mm.

However, the aforementioned displacements are measured using the following method or a method known by a person skilled in the art as being equivalent to this method.

Figure 7A:
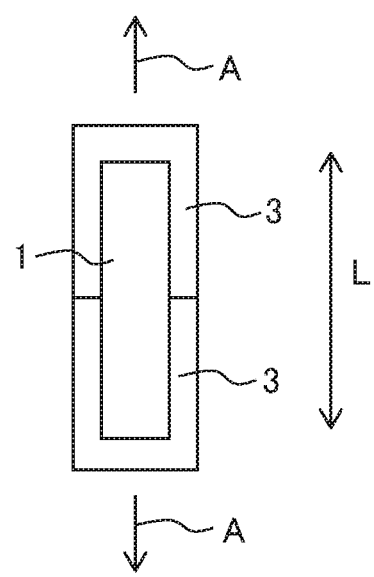
FIGS. 7A and 7B are diagrams for describing evaluation of displacement of a subject using the sheet of the present disclosure.
Figure 7B:
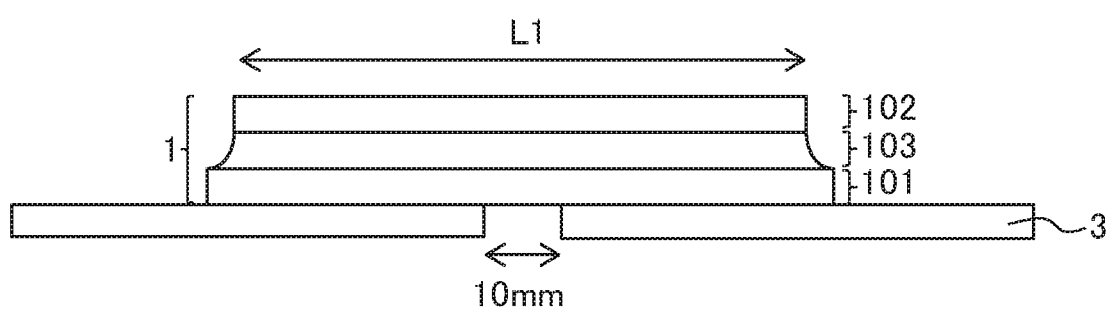

FIGS. 7A-7B are diagrams for describing evaluation of displacement of a subject using the sheet of the present disclosure, where FIG. 7A is an upper surface view, and FIG. 7B is a side surface view. In reference to FIGS. 7A and 7B, a sheet 1 of the present disclosure with a predetermined size (for example length 100 mm×width 25 mm) and two rectangular plates 3 to which the sheet can attach (for example, a metal plate made of stainless steel sheet or the like) were prepared. The fixing region of the first main surface of the sheet 1 is attached to the surface of the plate 3 so as to straddle the two plates 3 in the length direction of the sheet 1. The two plates 3 are grasped by a grasping jig (not illustrated in the drawings), and are pulled (as illustrated in FIG. 7B using a tensile tester (for example, SHIMADZU AUTOGRAPH AGS-X produced by Shimadzu Corporation from Kyoto City, Kyoto) until the distance between the plates becomes a predetermined distance (for example, 10 mm) at a rate of 5 mm/second in a direction that holds the two plates 3 apart. At this time for example, the tensile operation is continued even after the first section breaks. The length L1 of the surface on the second section 102 side of the sheet is measured (measured at the location where the length is largest), and the length of the second section 102 prior to testing (for example, 100 mm) is subtracted to give the displacement of the second section 102. The points that the displacement of the second section is approximately 30% or less than the displacement of the first section, and the displacement of the second section is approximately 3 mm or less when the first section is displaced by 10 mm both indicate that the precision of the evaluation of the displacement based on the moiré fringe generated by the first pattern image and the second pattern image is favorable.

Figure 8A:
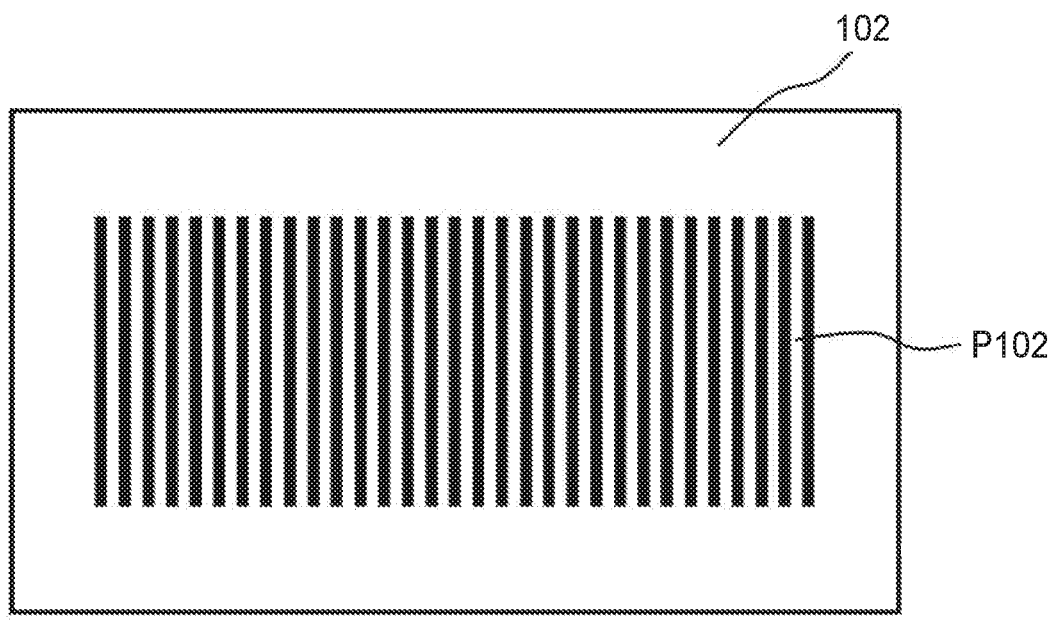
FIGS. 8A and 8B are diagrams illustrating an example of the sheet according to the present disclosure.
Figure 8B:
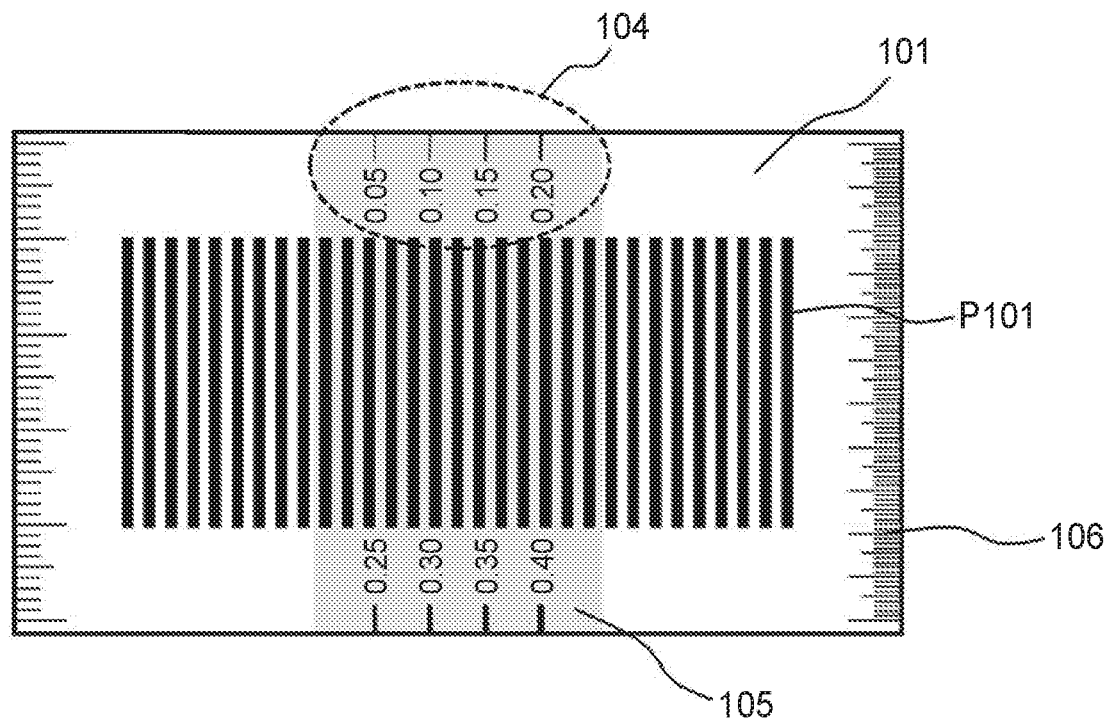

FIGS. 8A-8B are diagrams illustrating an example of the sheet according to the present disclosure. FIG. 8A is a diagram for describing a second section when seen from a second main surface side, and FIG. 8B is a diagram for describing a first section when seen from the second main surface side. The first section 101 illustrated in FIG. 8B, the third section (not illustrated in the FIGS. 8A and 8B), and the second section 102 illustrated in FIG. 8A of the sheet are arranged in order, and will be explained accordingly. With this aspect, the sheet can have one or more marks selected from a gauge, marker, or ruler. These marks may be arranged in the first section, second section, and third section of the sheet by, for example, printing the marks. In reference to FIGS. 8A and 8B, in this exemplified aspect, a first pattern image P101, gauge 104, marker 105, and ruler 106 are formed by printing, for example, on the first section 101, and the second pattern image P102 can be formed by printing, for example, on the second section 102. Incidentally, the gauge 104 displays a variety of line widths for measuring a width of displacement of the subject (crack, or the like) by comparing the width to the gauge, and a marker 105 for displaying a mark for aligning the position of the sheet with respect to the subject. Furthermore, the ruler 106 displays dimension marks.

With this exemplary aspect, the point that the gauge 104 and/or the marker 105 is provided at a position that overlaps with the non-fixing region when the she is viewed from a normal line direction of the first main surface is advantageous from the perspective of positively positioning the non-fixing region at the target evaluation position of the object.

This aspect has a gauge provided in a region that includes a region that overlaps the low adhesion surface when observing the sheet from the normal direction to the first main surface. Furthermore, this aspect has a gauge provided in a region that includes a region that includes a region that does not overlap with the first adhesive part and the second adhesive part when observing the sheet from the normal direction to the first main surface.

In a preferred embodiment, the first section includes a high extensibility layer having the first pattern image. In a preferred embodiment, the second section includes a low extensibility layer having the second pattern image. In a preferred embodiment, the third section includes a adhesive layer. In a preferred embodiment, the sheet is made from the high extensibility layer, low extensibility layer, and a adhesive layer.

In a typical embodiment, the high extensibility layer and the adhesive layer are bonded together through the adhesiveness of the high extensibility layer itself, the adhesiveness of the adhesive layer itself, a separate adhesive layer, or a combination of at least two of these. Additionally, in a typical embodiment, the adhesive layer and the low extensibility layer are bonded together through the adhesiveness of the adhesive layer itself, the adhesiveness of the low extensibility layer itself, a separate adhesive layer, or a combination of at least two of these.

<High Extensibility Layer>

The high extensibility layer can be configured using any material having enough extensibility to function as the first section. In a specific embodiment, the high extensibility layer is clear in consideration of making the pattern image visible. In a preferred embodiment, the high extensibility layer includes at least one type of polymer selected from a group consisting of polystyrenes, polyolefins, olefin copolymers, vinyl copolymers, (meth)acrylic polymers, (meth) acrylic copolymers, and polyurethanes. Note that in the present disclosure, "(meth)acrylic" means acrylic or methacrylic.

In a preferred embodiment, the high extensibility layer contains an (A):(B) mass ratio between a carboxyl group-containing (meth)acrylic copolymer (A) and an amino group-containing (meth)acrylic copolymer (B) of approximately 10:90 to approximately 90:10. In this case, the high extensibility layer can have excellent weather resistance and followability to an adherend.

In a preferred embodiment, the carboxyl group-containing (meth)acrylic copolymer (A) can be obtained by copolymerizing a composition containing a monoethylenically unsaturated monomer, which is a main component, and an unsaturated monomer containing a carboxyl group.

In a preferred embodiment, the amino group-containing (meth)acrylic copolymer (B) can be obtained by copolymerizing a composition containing a monoethylenically unsaturated monomer, which is a main component, and an unsaturated monomer containing an amino group.

It is preferable that the carboxyl group-containing (meth) acrylic copolymer (A) and the amino group-containing (meth)acrylic copolymer (B) be copolymerized through radical polymerization. In this case, a known polymerization method, such as solution polymerization, suspension polymerization, emulsion polymerization, bulk polymerization, and the like, can be used. Organic peroxides, such as benzoyl peroxide, lauroyl peroxide, bis(4-tert-butylcyclohexyl) peroxydicarbonate, and azo type polymerization initiators, such as 2,2'-azobisisobutyronitrile, 2,2'-azobis 2-methylbutyronitrile, 4,4'-azobis-4-cyanovaleric acid, 2,2'-azobis (2-methylpropionic acid) dimethyl, azobis 2,4-dimethylvaleronitrile (AVN), and the like, can be used as an initiator. It is preferable that the amount of the initiator used be approximately 0.05 parts by mass to approximately 5 parts by mass for every 100 parts by mass of a monomer mixture.

In the high extensibility layer, it is preferable that a Tg of either the carboxyl group-containing (meth)acrylic copolymer (A) or the amino group-containing (meth)acrylic copolymer (B) be 0° C. or more, while a Tg of the other be 0° C. or less. This is because the (meth)acrylic copolymer having the higher Tg gives the high extensibility layer high tensile strength, while the (meth)acrylic copolymer having the lower Tg improves the extensibility of the high extensibility layer.

In a preferred embodiment, the carboxyl group-containing (meth)acrylic copolymer (A) and the amino group-containing (meth)acrylic copolymer (B) each have a weight average molecular weight of approximately 10,000 or more, approximately 50,000 or more, approximately 100,000 or more, approximately 10,000,000 or less, or approximately 1,000,000 or less.

In a preferred embodiment, examples of the aforementioned monoethylenically unsaturated monomer include monomers represented by the general formula $CH_2=CR_1COOR_2$ (where, in the formula, $R_1$ is hydrogen or a methyl group, $R_2$ is a straight chain or branched alkyl group, phenyl group, alkoxyalkyl group, or phenoxyalkyl group), aromatic vinyl monomers, such as styrene, α-methylstyrene, vinyltoluene, and the like, and vinyl esters, such as vinyl acetate, and the like. Examples of such monomers include phenoxyalkyl (meth)acrylates, such as methyl (meth)acrylate, ethyl (meth)acrylate, n-butyl (meth)acrylate, isoamyl (meth)acrylate, n-hexyl (meth)acrylate, 2-ethylhexyl (meth)acrylate, isooctyl (meth)acrylate, isononyl (meth)acrylate, decyl (meth)acrylate, dodecyl (meth)acrylate, phenoxyethyl (meth)acrylate, and the like, methoxypropyl (meth)acrylates, and alkoxyalkyl (meth)acrylates, such as 2-methoxybutyl (meth)acrylate, and the like. One type, or two or more types of monoethylenically unsaturated monomer can be used to obtain a desired glass-transition temperature, tensile strength, and elongation characteristics corresponding to the purpose thereof.

For example, by copolymerizing a (meth)acrylic monomer, such as methyl methacrylate (MMA), n-butyl methacrylate (BMA), and the like, having a Tg of 0° C. or more when homopolymerized as a single substance, as a main component, a (meth)acrylic copolymer having Tg of 0° C. or more can easily be obtained.

Furthermore, by copolymerizing a component, such as ethyl acrylate (EA), n-butyl acrylate (BA), 2-ethylhexyl acrylate (2 EHA), and the like, having a Tg of 0° C. or less when homopolymerized as a single substance, as a main component, a (meth)acrylic copolymer having Tg of 0° C. or less can easily be obtained.

Here, the glass-transition temperatures (Tg) of the carboxyl group-containing (meth)acrylic copolymer (A) and the amino group-containing (meth)acrylic copolymer (B) are derived using an FOX formula (formula below) with each polymer having been copolymerized from n types of monomer.

$$1/Tg = X_1/(Tg_1 + 273\ 0.15) + X_2/(Tg_2 + 273.15) + \ldots + X_n/(Tg_n + 273\ 0.15)$$

($Tg_1$: glass transition temperature of component 1 homopolymer $Tg_2$: glass transition temperature of component 2 homopolymer $X_1$: monomer weight fraction of component 1 added during polymerization $X_2$: monomer weight fraction of component 2 added during polymerization $X_1 + X_2 + \ldots + X_n = 1$)

Examples of unsaturated monomers containing carboxyl groups that configure carboxyl group-containing (meth) acrylic copolymers when copolymerized with monoethylenically unsaturated monomers include acrylic acid, methacrylic acid, maleic acid, itaconic acid, ω-carboxypolycaprolactone monoacrylate, phthalic acid monohydroxyethyl (meth)acrylate, β-carboxyethyl acrylate, 2-(meth)acryloyloxyethyl succinic acid, 2-(meth)acryloyloxyethyl hexahydrophthalic acid, and the like.

It is preferable that the carboxyl group-containing (meth) acrylic copolymer be obtained by copolymerizing a monoethylenically unsaturated monomer as a main component (specifically, in the range of approximately 80 parts by mass to approximately 95.5 parts by mass) and an unsaturated monomer containing a carboxyl group in the range of approximately 0.5 parts by mass and approximately 20 parts by mass.

Examples of unsaturated monomers containing amino groups that configure amino group-containing (meth)acrylic copolymers when copolymerized with monoethylenically unsaturated monomers include dialkylaminoalkyl (meth) acrylates, such as N,N-dimethylaminoethyl acrylate (DMAEA), N,N-dimethylaminoethyl methacrylate (DMAEMA), and the like, dialkylaminoalkyl (meth)acrylamides, such as N,N-dimethylaminopropyl acrylamide (DMAPAA), N,N-dimethylaminopropyl methacrylamide, and the like, and monomers having tertiary amino groups represented by vinyl monomers having nitrogen-containing heterocycles, such as vinyl imidazole, and the like.

It is preferable that the amino group-containing (meth) acrylic copolymer be obtained by copolymerizing a monoethylenically unsaturated monomer as a main component (specifically, in the range of approximately 80 parts by mass to approximately 95.5 parts by mass) and an unsaturated monomer containing an amino group in the range of approximately 0.5 parts by mass and approximately 20 parts by mass.

After the carboxy group-containing (meth)acrylic copolymer and the amino group-containing (meth)acrylic copolymer have been polymerized separately as described above, the high extensibility layer can be formed using a standard film forming method. For example, the high extensibility layer can be formed by mixing a solution of these polymers, applying the solution on a liner peeling surface, and then drying and solidifying the solution. A standard coater, for example, a bar coater, knife coater, roll coater, die coater, or the like, can be used as an application device. A solidification operation similar to a drying operation in the case of a paint containing a volatile solvent or an operation for cooling a melted resin component is used. The high extensibility layer can also be formed using a melt extrusion molding method.

A high extensibility layer having a desired tensile strength and elongation characteristics can be obtained by changing a compounding ratio between the carboxy group-containing (meth)acrylic copolymer and the amino group-containing (meth)acrylic copolymer when the high extensibility layer is formed. Specifically, a compounding ratio between a polymer with a relatively high Tg and a polymer having a relatively low Tg involving the carboxy group-containing (meth)acrylic copolymer and the amino group-containing (meth)acrylic copolymer can be approximately 10:90 to approximately 90:10, approximately 20:80 to approximately 90:10, or approximately 30:70 to approximately 90:10. In a preferred embodiment, there is more of the copolymer having a relatively high Tg than there is of the copolymer having a relatively low Tg.

In a preferred embodiment, the high extensibility layer also contains a crosslinking agent having a functional group reactive with a carboxyl group (C) in addition to the aforementioned carboxy group-containing (meth)acrylic copolymer (A) and amino group-containing (meth)acrylic copolymer (B). The cross linking agent contributes to the cross linking of the carboxy group-containing (meth)acrylic copolymer (A) and the amino group-containing (meth)acrylic copolymer (B). This kind of crosslinking forms a mesh structure, which further enhances the elongation characteristics in the high extensibility layer. Advantageously, the crosslinking agent has a functional group that can react with carboxyl groups and, specifically, a bisamide crosslinking agent (for example, RD1054, manufactured by 3M), an aziridine type crosslinking agent (for example, Chemitite PZ33, manufactured by Nippon Shokubai Co., Ltd., and NeoCryl CX-100, manufactured by Avecia), a carbodiimide type crosslinking agent (for example, Carbonlite V-03, V-05, and V-07, manufactured by Nisshinbo), an epoxy type crosslinking agent (for example, E-AX, E-5XM, and E5C, manufactured by Soken Chemical & Engineering Co., Ltd.), or the like, can be used. The amount of the crosslinking agent used is approximately 0.1 to approximately 5 parts by mass with respect to every 100 parts by mass of the carboxy group-containing (meth)acrylic copolymer (A).

The high extensibility layer may also contain at least one type of a variety of additives as desired. Antioxidants, ultraviolet light absorbers, light stabilizers, plasticizers, lubricants, antistatic agents, flame retardants, fillers, and the like, are exemplary additives.

In a preferred embodiment, the high extensibility layer has the strength not to break in response to, for example, a displacement of around several millimeters. From this perspective, it is preferable that the high extensibility layer have tensile strength of approximately 100 Mpa or less. Also from this perspective, a thickness of the high extensibility layer may be approximately 10 µm to approximately 150 µm, or approximately 30 µm to approximately 100 µm.

In a preferred embodiment, the high extensibility layer has first and second main surfaces, and a first pattern image on the first main surface. The first pattern image is, for example, a printed layer. For example, a high extensibility layer having a printed layer can be formed using, for example, a method that prints a desired pattern image directly onto a front surface of an extensible film formed from a polymer like those described above, a method that transfers a printed layer having a desired pattern image formed on a supporting body onto said extensible film, and the like. Printing can be performed by inkjet, gravure, letterpress, flexo, screen, electrostatic copying, sublimation heat transfer, and the like. In an exemplary embodiment, the high extensibility layer and the adhesive layer are fixed together so that the first main surface faces the adhesive layer. In this case, the first pattern is protected by the adhesive layer, which is advantageous because the pattern image is thus not prone to being damaged. In a different exemplary embodiment, the second main surface may face the adhesive layer. In this case, the first pattern image may be protected by a coated layer, and the like.

<Low Extensibility Layer>

A low extensibility layer has less extensibility than the high extensibility layer. The low extensibility layer can be configured using any material having enough low extensibility to function as the second section. The low extensibility layer is typically clear in consideration of making the pattern image visible.

In a preferred embodiment, the low extensibility layer includes at least one type of polymer selected from a group consisting of polyesters, polyolefins, and polyvinyls. Typically, the low extensibility layer can be a hard film. The hard film may be one available on the market, and examples of commercially available products include polyesters, polyolefins, polyvinyls, polystyrenes, polyacrylates, polymethacrylates, polyimides, polyurethanes, polyimides, polyamides, polysulfones, polyethers, polyacetals, polyphenylenes, polyepoxy resins, phenol resins, nylons, polycarbonates, and the like.

In a typical embodiment, the low extensibility layer may be exposed to the environment during use. Accordingly, it is preferable that the low extensibility layer have superior weather resistance. From this perspective, a polyester is a preferable as the low extensibility layer.

In a typical embodiment, the low extensibility layer is strong enough to substantially not displace when the high extensibility layer displaces. From this perspective, it is preferable that the low extensibility layer have tensile strength of approximately 50 Mpa or less. Also from this perspective, a thickness of the low extensibility layer may be approximately 10 µm to approximately 150 µm, or approximately 50 µm to approximately 100 µm.

In a preferred embodiment, the low extensibility layer has first and second main surfaces, and a second pattern image on the first main surface. The second pattern image is, for example, a printed layer. For example, a low extensibility layer having a printed layer can be formed using, for example, a method that prints a desired pattern image directly onto a front surface of a non-extensible film, a method that transfers a printed layer having a desired pattern image formed on a supporting body onto said non-extensible film, and the like. Printing can be performed by inkjet, gravure, letterpress, flexo, screen, electrostatic copying, sublimation heat transfer, and the like. In an exemplary embodiment, the low extensibility layer and the adhesive layer are fixed together so that the first main surface faces the adhesive layer. In this case, the second pattern is protected by the adhesive layer, which is advantageous because the pattern image is thus not prone to being damaged. In a different exemplary embodiment, the second main surface may face the adhesive layer. In this case, the second pattern image may be protected by a coated layer, and the like.

<Adhesive Layer>

A viscoelastic layer has the ability to attenuate through an action that elastically deforms a position of a first section, and can be configured using any viscoelastic material having enough deformation buffering capacity to ensure that a second section substantially does not displace when the first section displaces. The viscoelastic layer is typically clear in consideration of making the pattern image visible.

In a preferred embodiment, the viscoelastic layer includes at least one type of polymer selected from a group consisting of polyolefins and olefin copolymers (hereinafter also referred to collectively as olefin (co)polymers), vinyl copolymers (for example, vinyl chloride polymers, and the like), (meth)acrylic polymers and (meth)acrylic copolymers (hereinafter also referred to collectively as (meth)acrylic (co)polymers) (for example, copolymers of poly(meth)acrylate, acrylic acid, acrylamide, and the like), polyurethanes (for example, polyether urethanes, polyester urethanes, and the like), and silicone polymers (for example, methyl vinyl silicones, and the like). Furthermore, the viscoelastic layer may also be a rubber layer, where examples of rubbers include butane type rubbers, butyl type rubbers, and the like.

Examples of raw material monomers of (meth)acrylic (co)polymers include (meth)acrylic monomers having straight chain or branched alkyl groups having 14 to 22 carbon atoms (hereinafter also referred to as C14-22 (meth) acrylic monomers), for example, isostearyl (meth)acrylates, cetyl (meth)acrylates, n-stearyl (meth)acrylates, n-behenyl (meth)acrylates, isomyristyl (meth)acrylates, isopalmityl (meth)acrylates, and the like.

The raw material monomers may also include unsaturated monocarboxylic acids (for example, acrylic acids, methacrylic acids, and the like), unsaturated dicarboxylic acids (for example, maleic acids, itaconic acids, and the like), ω-carboxypolycaprolactone monoacrylate, phthalic acid monohydroxyetyl (meth)acrylate, O-carboxyethyl acrylate, 2-(meth)acryloyloxyethyl succinic acid, or carboxyl group-containing monomers, such as 2-(meth)acryloyloxyethyl hexahydrophthalic acid, and the like.

For example, when the raw material monomer includes a C14-22 (meth)acrylic monomer and a carboxyl group-containing monomer, a formulation can be approximately 5 wt % to approximately 8 wt % of the carboxyl group-containing monomer with respect to approximately 92 wt % to 95 wt % of the C14-22 monomer. When the amount of the carboxyl group-containing monomer is approximately 5 wt % or more, a shear storage modulus of the viscoelastic layer G' is large, which is advantageous because cohesive force is good. Furthermore, a loss tangent tan δ is large, which is advantageous in terms of displacement buffering capability. Meanwhile, it is advantageous that when the amount of the carboxyl group-containing monomer is approximately 8 wt % or less, the displacement buffering capacity has only a small amount of temperature dependency.

Examples of olefin (co) polymers include saturated polyolefins, that is, polyolefins having substantially no carbon double or triple bonds. For example, of the carbon bonds included in the saturated polyolefin, it is preferable that 90% or more of said bonds be single bonds. Examples of saturated polyolefins include polyethylenes, polybutenes, polypropylenes, polyisobutylenes, poly α-olefins, ethylene propylene copolymers, ethylene α-olefin copolymers, propylene α-olefin copolymers, hydrogenated polybutadienes, and the like. These may be used alone or two or more types may be used in combination.

Non-crystalline polymers can be used in the saturated polyolefin. Non-crystalline polymer is intended to mean either a polymer with an extremely small degree of crystallinity or a polymer that cannot be crystallized. While glass-transition temperatures can are measured with non-crystalline polymers, melting points are not measured. When a non-crystalline polymer is used, the shear storage modulus G' at 0° C. to 40° C. in the viscoelastic layer is adjusted to, for example, $1.5 \times 10^4$ to $5.0 \times 10^6$ pascals (Pa), so that good deformation buffering capacity can be obtained, and so that the viscoelastic layer and the other layers can be adhered satisfactorily.

A block copolymer (hereinafter referred to as a block copolymer) including a saturated polyolefin block and an aromatic vinyl monomer block can be used, and this block copolymer includes a block made from a polyolefin having substantially no double or triple carbon bonds and a block made from an aromatic vinyl monomer. For example, of the carbon bonds included in the saturated polyolefin, it is preferable that 90% or more of said bonds be single bonds. Examples of aromatic vinyl monomers include styrenes, p-methyl styrenes, α-methyl styrenes, indene, and the like. These may be used alone or two or more types may be used in combination. Examples of block copolymers include styrene-ethylene-propylene-styrene block copolymers, styrene-ethylene-propylene block copolymers, styrene-ethylene-butylene-styrene block copolymers, and the like.

Non-crystalline saturated polyolefin blocks can be used. When a non-crystalline block is used, the shear storage modulus G' at 0° C. to 40° C. in the viscoelastic layer is adjusted to, for example, $1.5 \times 10^4$ to $5.0 \times 10^6$ Pascals (Pa), so that good deformation buffering capacity can be obtained, and so that the viscoelastic layer and the other layers can be adhered satisfactorily.

A compounding ratio of the saturated polyolefin and/or the block copolymer can be approximately 2 parts by mass to approximately 40 parts by mass with respect to every 100 parts by mass of a (meth)acrylic (co)monomer. When the ratio is approximately 2 parts by mass or more, a viscoelastic layer with a small degree of temperature dependency can be obtained, and, when the ratio is approximately 40 parts by mass or less, weather resistance is favorable, and this is advantageous for reliability during long-term use and adhesion to other parts.

The weight average molecular weight of the (meth)acrylic (co)polymer can be in the range of approximately 10,000 to approximately 2,000,000. The aforementioned range is advantageous in terms of obtaining a viscoelastic layer that is advantageous in terms of long term use reliability.

In addition to polymers like the ones described above, the viscoelastic layer may also include tackifying resins, including, for example, rosin resins, modified rosin resins (hydrogenated rosin resins, dis-proportionated rosin resins, polymerized rosin resins, and the like), terpene resins, terpene phenolic resins, aromatic modified terpene resins, C5 and C9 type petroleum resins, coumarone resins, and the like. The layer may also include commonly used additives, such as thickeners, thixotropic agents, bulking agents, fillers, and the like.

More detailed examples of viscoelastic materials that can be used in the viscoelastic layer are disclosed in, for example, JP 2009-249485, JP 2006-28224, and the like.

When the viscoelastic layer is too thin, the low extensibility layer can also deform in conjunction with the deformation of the high extensibility layer, meanwhile, if the viscoelastic layer is too thick, the first pattern image and the second pattern image can shift based on an observation angle, which can, accordingly, lead to a drop in the visibility of the moiré fringe. In a preferred embodiment, the thickness of the viscoelastic layer is approximately 100 μm to approximately 1.5 mm, or approximately 500 μm to approximately 1.0 mm.

<Sheet Characteristics>

In a preferred embodiment, when the sheet is subjected to a tensile test, the high extensibility layer exhibits tensile strength of 0.5 MPa or more and 100 MPa or less, and elongation of 3% or more and 200% or less. In a preferred embodiment, when the sheet is subjected to a tensile test, the low extensibility layer exhibits tensile strength of 50 MPa or more and 350 MPa or less, and elongation of 1% or more and 200% or less. In a preferred embodiment, when the sheet is subjected to a tensile test, the adhesive layer exhibits tensile strength of 0.01 MPa or more and 100 MPa or less, and elongation of 10% or more and 3000% or less.

Tensile strength and elongation are measured under the following conditions in accordance with the method set forth in JIS K6251 (2010 Edition, ISO 37).

Measurement sample shape: "Dumbbell shape No. 3" disclosed in JIS K6251
Tensile speed: 300 mm/min
Measuring speed: 23±1° C.

Tensile strength T (units: MPa) is derived from the following formula after measuring maximum tensile strength F (units: N) until each layer of the measurement sample breaks, and the cross sectional area A (units: mm²) of each layer of the measurement sample that is measured.

$T=F/A$

Elongation E (units: %) is derived from the following formula by measuring on a measurement sample a gauge line distance L1 (units: mm) when each layer breaks, and an initial gauge line distance L0 (25 mm).

$E=(L1-L0)/L0 \times 100$

Typically, when the sheet according to the present disclosure is subjected to the aforementioned tensile test, each of the layers break, and, in an exemplary embodiment, the low extensibility layer, viscoelastic layer, and high extensibility layer break, in that order. Accordingly, while contributions by other layers are included in the values measured using the aforementioned method as the tensile strength and elongation of the each layer, in the present disclosure, such measurement values are defined as the tensile strength and elongation of each layer in the sheet.

In a preferred embodiment, when just the high extensibility layer of the sheet is pulled in a sheet in-plane direction, the high extensibility layer breaks before the low extensibility layer breaks. This can be confirmed by, in reference to FIG. 5, the fact that the high extensibility layer breaks before the low extensibility layer does.

Also, in a preferred embodiment, the elongation of the low extensibility layer is 0 to 35% of the elongation of the high extensibility layer at the time the high extensibility layer breaks as described above. This ratio can be assessed as the ratio between the elongation of the high extensibility layer and the elongation of the low extensibility layer at the time the high extensibility layer breaks. This kind of ratio contributes to an accurate evaluation of an amount of displacement by an object using a moiré fringe.

In a preferred embodiment, the Young's modulus of the first section or the high extensibility layer is approximately 0.5 GPa or less, approximately 0.1 GPa or less, or approximately 0.05 GPa or less. Also, in a preferred embodiment, the Young's modulus of the second section or the low extensibility layer is approximately 1.0 GPa or more, approximately 1.5 GPa or more, or approximately 2.0 GPa or more. Note that the aforementioned Young's modulus values are values obtained by setting a sample cut to a width of 10 mm in a tensile tester with a chuck distance of 100 mm, pulling the sample in a vertical direction at a speed of 1 mmpm, and then, calculating the Young's modulus based on an S-S curve incline in a portion where distortion % has reached 0.05 to 0.25%.

An adhesive force with respect to a mortar board of approximately 1.0 N/cm$^2$ or more in a shear direction, in accordance with JIS K5600 (ISO 2409), is an example of a fixing area, that is, of preferred adhesive properties of a high adhesion surface. These kind of adhesive properties are advantageous in terms of the fact that said properties allow a sheet to be securely fixed to an object when the object is, for example, concrete, metal, and the like.

In a preferred embodiment, substantially all portions of the sheet according to the present disclosure are configured using clear materials, except the first and second pattern images, the gauge, the marker, and the ruler.

In consideration of making a moiré easily visible, an area ratio (for example, a ratio B/A of an area B of a low adhesion surface with respect to an area A of a high adhesion surface) of a non-fixing area with respect to an area of the fixing area is preferably approximately 1% or more, or approximately 5% or more, and, in consideration of fixing well to an object, preferably approximately 500% or less, or approximately 300% or less.

In consideration of fixing well to an object, an area ratio (for example, a ratio D/C of an area D (for example, a total area of a first sticky section and a second sticky section) of a high adhesion section with respect to an area C of a first main surface) is preferably approximately 10% or more, or approximately 30% or more, and, in consideration of making a moiré easily visible, preferably approximately 99% or less, or approximately 95% or less.

Furthermore, in consideration of being able to perform spatial frequency analysis close to the same amount in both the x axis and y axis directions on a two-dimensional plane during displacement evaluation by a moiré fringe, an aspect ratio of a low adhesion surface is approximately 0.5 to approximately 2.0, approximately 0.7 to approximately 1.3, or approximately 0.9 to approximate 1.1.

The size of the sheet according to the present disclosure can be appropriately designed in consideration of ease of sticking in accordance with damage to an adherend or an object to be measured. In an exemplary embodiment, and entire area (that is, a total area of the fixing area and the non-fixing area) of the first main surface is approximately 1 cm$^2$ to approximately 1,000 cm$^2$, or approximately 2 cm$^2$ to approximately 500 cm$^2$, and is thus appropriate for an application for measuring a crack in concrete in a building.

Note that while the sheet according to an embodiment of the present disclosure has the fixing area and the non-fixing area, the present disclosure also encompasses any sheet that is the same as the sheet according to the present disclosure described above except that substantially an entire surface of a first major surface thereof is the fixing area.

<Article for Evaluating Building Deformation>

Another aspect of the present disclosure provides an article for evaluating deformation of a building, containing the aforementioned sheet of the disclosure. In a typical aspect, the article for evaluating deformation of the building is configured to be able to fix the subject to the article for evaluating deformation of a building by the fixing region of the sheet of the present disclosure. The article for evaluating the deformation of the building of the present disclosure is divided in any form that can fix to the subject. With this aspect, the article for evaluating the deformation of the building is the sheet of the present disclosure.

<Use of Sheet or Article for Evaluating Building Deformation>

The sheet of the present disclosure can be used for evaluating the displacement of various subjects by using the properties of being able to clearly and simply evaluate the displacement that occurs in the subject. The sheet of the present disclosure can be applied to subjects with a wide range of materials and shapes, but conceivable subjects in particular include concrete surfaces and metal surfaces (for example wall surfaces) of buildings, tunnels, bridges, and the like.

Evaluation of the moiré fringe generated by the first and second pattern images can be performed using a conventionally known device and method. For example, the moiré fringe is imaged using an imaging device such as a 3-D camera or the like, the displacement of the first section can be evaluated based on the moiré fringe by analyzing the image that is obtained using suitable image analysis software, and therefore the displacement created by the subject can be evaluated. The imaging method or the like can be appropriately selected, but if a moiré fringe is generated by the difference in the pitch of the first and second pattern images, the enlargement factor can be set to the square of the value obtained by dividing the pitch of the first and second pattern image by the shift between these pattern images. For example, if one pitch of the first and second pattern images is 0.5 mm and the other pitch is 0.4 mm, a method that increases the enlargement factor by 25 times can be suggested, but if the pitch of one of the first and second pattern images is 0.5 mm and the other pitch is 0.45 mm, a method that increases the enlargement factor by 100 times can be suggested. For example, if the pitch of one of either the first and second pattern image is 0.5 mm and the pitch of the other is 0.45 mm, the point that a moiré fringe with a pitch of $(0.5/(0.5-0.45))^2$ mm will be observed would be understood based on the technical knowledge of a person of ordinary skill in the art.

Embodiments were described above, but the present disclosure is not limited to the aforementioned embodiments.

INDUSTRIAL APPLICABILITY

The sheet of the present disclosure is used by fixing to any subject that requires evaluation of displacement, and can clearly and easily evaluate displacement even if the amount of displacement is small. The sheet is particularly useful in applications for articles used to evaluate deformation of buildings.

FIGURE REFERENCE NUMBERS

1 Sheet
101 First section

102 Second section
103 Third section
104 Gauge
105 Marker
106 Ruler
101a, 101b Fixing region
101c Non-fixing region
111, 121, 131 Main unit
111a, 131a First adhesive part
111b, 131b Second adhesive part
121c, 131c Low adhesive part
O Subject
P101 First pattern image
P102 Second pattern image
S1 First main surface
S2 Second main surface
S111a, S111b, S121a, S121b, S131a, S131b High adhesion surface
S111c, S121c S131c Low adhesion surface Exemplary Embodiments Item 1. A sheet having a first main surface and a second main surface facing the first main surface, comprising:
a first section with a first pattern image,
a second section with a second pattern image, and
a third section provided between the first section and the second section;
the first section has higher extensibility than the second section,
the first section includes the first main surface of the sheet,
the second section includes the second main surface of the sheet,
the first pattern image is visible through the second pattern image, and
the first main surface includes a high adhesion surface and a low adhesion surface.
Item 2. The sheet according to Item 1, wherein the high adhesion surface is configured of one or more type of pressure sensitive adhesive selected from the group consisting of acrylic adhesives, rubber adhesives, and epoxy adhesives.
Item 3. The sheet according to Item 1 or 2, comprising a gauge provided in a region that includes a region that overlaps the low adhesion surface when observing the sheet from the normal direction to the first main surface.
Item 4. The sheet according to any one of Items 1 to 3, wherein the ratio B/A of the surface area A of the high adhesive surface to the surface area B of the low adhesive surface is 1% to 500%.
Item 5. A sheet having a first main surface and a second main surface facing the first main surface, comprising:
a first section with a first pattern image,
a second section with a second pattern image, and
a third section provided between the first section and the second section;
the first section has higher extensibility than the second section,
the first section includes the first main surface of the sheet,
the second section includes the second main surface of the sheet,
the first pattern image is visible through the second pattern image, and
the first main surface includes a first adhesive part and a second adhesive part separated from the first adhesive part.
Item 6. The sheet according to Item 5, wherein the first adhesive part and the second adhesive part are configured of one or more type of pressure sensitive adhesive selected from the group consisting of acrylic adhesives, rubber adhesives, and epoxy adhesives.
Item 7. The sheet according to Item 5 or 6, comprising a gauge provided in a region that includes a region that does not overlap the first adhesive part and the second adhesive part when observing the sheet from the normal direction to the first main surface.
Item 8. The sheet according to any one of Items 5 to 7, wherein the ratio D/C of the total surface area D of the first adhesive part and the second adhesive part with regard to the surface area C of the first main surface is 10% to 99%.
Item 9. The sheet according to any one of Items 1 to 8, wherein
the first section includes a high extensibility layer with a first pattern image,
the second section includes a low extensibility layer with a second pattern image,
and the third section includes an adhesive layer.
Item 10. The sheet according to Item 9, wherein when the sheet is subjected to a tensile test,
the high extensibility layer demonstrates Young's modulus of 0.5 GPa or lower, and
the low extensibility layer demonstrates Young's modulus of 1.0 GPa or lower.
Item 11. The sheet according to Item 9, wherein when the sheet is subjected to a tensile test,
the high extensibility layer demonstrates tensile strength of 0.5 MPa or higher and 100 MPa or lower, and elongation of 3% or higher and 200% or lower,
the low extensibility layer demonstrates tensile strength of 50 MPa or higher and 350 MPa or lower, and elongation of 1% or higher and 200% or lower,
the adhesive layer demonstrates tensile strength of 0.01 MPa or higher and 100 MPa or lower, and elongation of 10% or higher and 3000% or lower.
Item 12. The sheet according to any one of Items 9 to 11, wherein when just the high extensibility layer is pulled in a sheet in-plane direction, the high extensibility layer breaks before the low extensibility layer breaks.
Item 13. The sheet according to Item 12, wherein the elongation of the low extensibility layer is 0 to 35% of the elongation of the high extensibility layer at the time the high extensibility layer breaks.
Item 14. The sheet according to any one of Items 9 to 13, wherein the high extensibility layer includes at least one type of polymer selected from a group consisting of polystyrenes, polyolefins, olefin copolymers, vinyl copolymers, (meth)acrylic polymers, (meth)acrylic copolymers, and polyurethanes.
Item 15. The sheet according to any one of Items 9 to 14, wherein the low extensibility layer includes at least one type of polymer selected from a group consisting of polyesters, polyolefins, polyvinyls, polystyrenes, polyacrylates, polymethacrylates, polyimides, polyurethanes, polyimides, polyamides, polysulfones, polyethers, polyacetals, polyphenylenes, polyepoxy resins, phenol resins, nylons, polycarbonates, and the like.
Item 16. The sheet according to any one of Items 9 to 15, wherein the adhesive layer includes at least one type of polymer selected from a group consisting of polyolefins, olefin copolymers, vinyl copolymers, (meth)acrylic polymers, (meth)acrylic copolymers, polyurethanes, and silicone polymers.

Item 17. The sheet according to any one of Items 1 to 16, wherein the ratio of displacement of the second section is 30% or less than the displacement of the first section of 100%.

Item 18. The sheet according to any one of Items 1 to 17, wherein the second section demonstrates displacement of 3 mm or less when the first section is displaced by 10 mm.

Item 19. An article for evaluating deformation of a building, comprising the sheet according to any one of Items 1 to 18.

What is claimed is:

1. A sheet having a first main surface and a second main surface facing the first main surface, comprising:
   a first section with a first pattern image,
   a second section with a second pattern image, and
   a third section provided between the first section and the second section;
   the first section has higher extensibility than the second section,
   the first section includes the first main surface of the sheet,
   the second section includes the second main surface of the sheet,
   the first pattern image is visible through the second pattern image, and
   the first main surface includes a high adhesion surface and a low adhesion surface.

2. The sheet according to claim 1, wherein the high adhesion surface is configured of one or more type of pressure sensitive adhesive selected from the group consisting of acrylic adhesives, rubber adhesives, and epoxy adhesives.

3. The sheet according to claim 1, comprising a gauge provided in a region that includes a region that overlaps the low adhesion surface when observing the sheet from the normal direction to the first main surface.

4. The sheet according to claim 1, wherein the ratio B/A of the surface area A of the high adhesive surface to the surface area B of the low adhesive surface is 1% to 500%.

5. A sheet having a first main surface and a second main surface facing the first main surface, comprising:
   a first section with a first pattern image,
   a second section with a second pattern image, and
   a third section provided between the first section and the second section;
   the first section has higher extensibility than the second section,
   the first section includes the first main surface of the sheet,
   the second section includes the second main surface of the sheet,
   the first pattern image is visible through the second pattern image, and
   the first main surface includes a first adhesive part and a second adhesive part separated from the first adhesive part.

6. The sheet according to claim 5, wherein the first adhesive part and the second adhesive part are configured of one or more type of pressure sensitive adhesive selected from the group consisting of acrylic adhesives, rubber adhesives, and epoxy adhesives.

7. The sheet according to claim 5, comprising a gauge provided in a region that includes a region that does not overlap the first adhesive part and the second adhesive part when observing the sheet from the normal direction to the first main surface.

8. The sheet according to claim 5, wherein the ratio D/C of the total surface area D of the first adhesive part and the second adhesive part with regard to the surface area C of the first main surface is 10% to 99%.

9. The sheet according to claim 5, wherein
   the first section includes a high extensibility layer with a first pattern image,
   the second section includes a low extensibility layer with a second pattern image,
   and the third section includes an adhesive layer.

10. The sheet according to claim 9, wherein when the sheet is subjected to a tensile test,
    the high extensibility layer demonstrates Young's modulus of 0.5 GPa or lower, and
    the low extensibility layer demonstrates Young's modulus of 1.0 GPa or lower.

11. The sheet according to claim 9, wherein when the sheet is subjected to a tensile test,
    the high extensibility layer demonstrates tensile strength of 0.5 MPa or higher and 100 MPa or lower, and elongation of 3% or higher and 200% or lower,
    the low extensibility layer demonstrates tensile strength of 50 MPa or higher and 350 MPa or lower, and elongation of 1% or higher and 200% or lower,
    the adhesive layer demonstrates tensile strength of 0.01 MPa or higher and 100 MPa or lower, and elongation of 10% or higher and 3000% or lower.

12. The sheet according to claim 9, wherein when just the high extensibility layer is pulled in a sheet in-plane direction, the high extensibility layer breaks before the low extensibility layer breaks.

13. The sheet according to claim 12, wherein the elongation of the low extensibility layer is 0 to 35% of the elongation of the high extensibility layer at the time the high extensibility layer breaks.

14. The sheet according to claim 9, wherein the high extensibility layer includes at least one type of polymer selected from a group consisting of polystyrenes, polyolefins, olefin copolymers, vinyl copolymers, (meth)acrylic polymers, (meth)acrylic copolymers, and polyurethanes.

15. The sheet according to claim 9, wherein the low extensibility layer includes at least one type of polymer selected from a group consisting of polyesters, polyolefins, polyvinyls, polystyrenes, polyacrylates, polymethacrylates, polyimides, polyurethanes, polyimides, polyamides, polysulfones, polyethers, polyacetals, polyphenylenes, polyepoxy resins, phenol resins, nylons, polycarbonates, and the like.

* * * * *